Aug. 27, 1968      R. L. MILLER      3,398,430
EXTRUDER
Filed Sept. 1, 1966
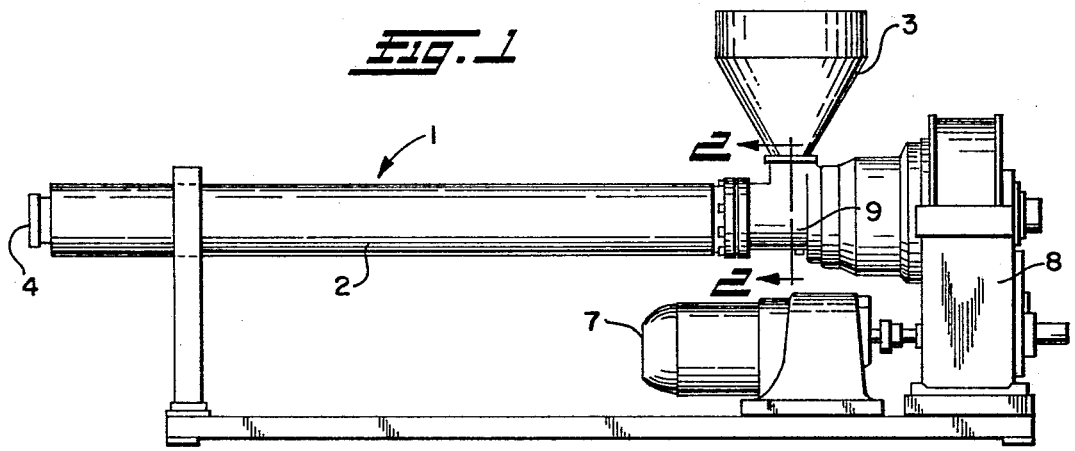
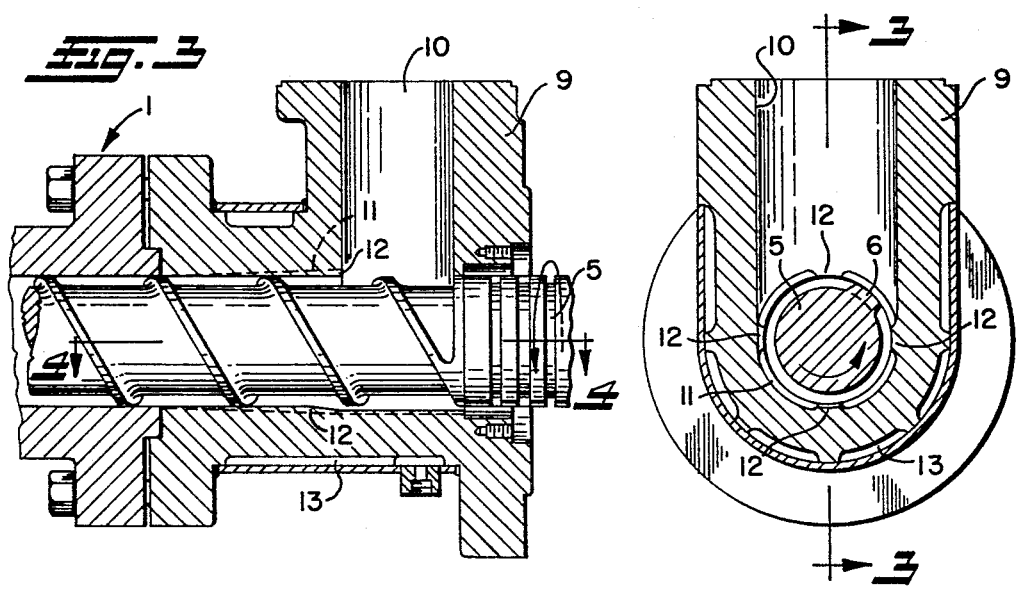
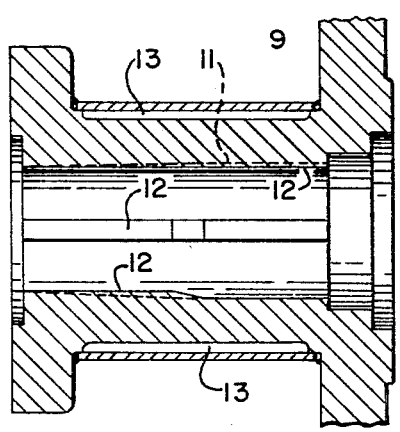
INVENTOR
ROBERT L. MILLER
BY *Oberlin, Maky & Donnelly*
ATTORNEYS

United States Patent Office 3,398,430
Patented Aug. 27, 1968

3,398,430
EXTRUDER
Robert L. Miller, Barberton, Ohio, assignor to NRM Corporation, Akron, Ohio, a corporation of Ohio
Filed Sept. 1, 1966, Ser. No. 576,574
5 Claims. (Cl. 18—12)

ABSTRACT OF THE DISCLOSURE

An extruder having a tapered bore adjacent the feed opening into which solid particles of plastic are wedged as they are advanced by the feed screw, and circumferentially spaced apart splines on the wall of the tapered bore to resist turning of the plastic while it is compressed by the wall of the tapered bore.

---

The present invention relates generally as indicated to an extruder and more particularly to improvements in the material feed zone of a screw type extruder.

As well known in the art, screw type extruders comprise an elongated heated barrel having a feed opening adjacent one end, an extrusion die at the other end, and a feed screw rotatable in the barrel to plasticize the plastic material as it is advanced by the screw from the feed opening toward the die. In a typical screw type extruder, the feed screw has an initial feeding section of maximum channel depth, a compression section of gradually decreasing channel depth, and a metering section of minimum channel depth, and between the forward end of the screw and the die there is usually provided a screen pack and breaker plate to hold back any unmelted particles. With some plastic materials the feed thereof to the screw may be of such low density that the screw does not have sufficient compression in itself to fill the metering section. Furthermore, the unmelted particles of plastic in the feeding section may tend to slip and roll over one another whereby again the metering section of the screw may not receive sufficient melted plastic to fill the metering flights of the screw. Under these circumstances, the productive capacity of the extruder is decreased and the extruded product may be of inferior quality.

It is accordingly a principal object of this invention to provide an extruder which has a tapered bore adjacent the feed opening with at least one axially extending spline in the wall thereof to enable the screw flights to pull in more material for precompressing the same and expelling air therefrom thereby to increase the feeding capacity of the screw and to produce a high quality extruded product, such tapered bore and spline being effective as to resist rotation of the solid material as it is precompressed and advanced into the portion of the barrel at and adjacent the feed opening.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a side elevation view of a screw type extruder embodying the present invention;

FIG. 2 is an enlarged cross-section view taken substantially along the line 2—2, FIG. 1;

FIG. 3 is a cross-section view taken substantially along the line 4—4, FIG. 3.

FIG. 4 is a cross-section view taken substantially along the line 4—4, FIG. 3.

Referring now more particularly to the drawings, and first to FIG. 1 thereof, the extruder 1 herein shown by way of illustrative example comprises a heated barrel 2 having a feed hopper 3 adjacent one end for introduction of plastic pellets, granules, chips or the like, and an extrusion die 4 at the other end from which plasticized material is extruded. Rotatable within said barrel 2 is a feed screw 5 which has thereon helical flights 6 effective to advance plastic material therearound from the feed hopper 3 toward the extrusion die 4, the screw being effective in well known manner to compress, work, and smear the plastic particles to cause the same to be plasticized for being forced out of the extruder 1 through the extrusion die 4. The screw 5 is thus rotated in the barrel 2 as by means of the electric drive motor 7 and reduction gearing (not shown contained in the housing 8 which supports the hopper end of the barrel 2).

As seen in FIGS. 1 to 4, the feed hopper 3 is secured to the feed throat 9 which is bolted to the rear end of the barrel 2. As evident, when the feed screw 5 is rotated in the direction of the arrow in FIG. 3, the solid plastic particles fed thereto through feed opening 10 will be advanced toward the left by the helical flight 6.

When certain types of plastic materials, e.g., styrene chips as obtained when thin sheet is ground for reprocessing, are to be extruded, the particles may slip or roll over one another without generating sufficient friction between the bore of the barrel 2 and the particles whereby the particles will rotate as a plug in unison with the feed screw 5 and thus will not be advanced at desired rate for effective compression and working. Furthermore, the solid plastic fed to the feed throat 9 may be of such low density that the feed screw 5 does not have sufficient compression by itself to fill the metering section which, in the case of a conventional single stage extruder, would be located along the front end of the screw 5 after the intermediate compression section.

In order to enable the screw flight 6 to pull in additional material and to precompress it to expel air, and to increase the feeding capacity of the screw 5, the bore 11 of the feed throat 9 is tapered as shown in FIG. 3 from a diameter somewhat greater than the major diameter of the helical flight 6 down to approximately such major diameter, such bore 11 being provided with axially extending keys or splines 12 which resist turning of the plastic particles, thus to improve the feeding capacity of the screw 5. When multiple splines 12 are employed as in FIGS. 1 to 4, it is desirable to vary the depths thereof in the axial region of the feed opening 10 to allow material to reach all of the tapered areas between the splines 12. Thus, as clearly shown in the drawing and particularly FIGS. 2 and 4, the spline 12 circumferentially closest to the feed opening 10 in the direction of material flow ends or has substantially no radial depth in the axial region of the feed opening so that it will not obstruct the material flow around the periphery of the feed screw; the next closest spline 12 in the direction of material flow is of a greater radial depth in the region of the feed opening but still provides a radial clearance with the screw to permit flow therepast, and so on; the furthest spline 12 from the direction of material flow being of substantial depth in the region of the feed opening with substantially no clearance with the feed screw to resist turning of the plastic in such region. As the plastic particles are advanced to the left from the feed opening 10, the tapered bore 11 effectively radially compresses the particles so as to completely fill the helical space in the flight 6 of the feed screw 5. Such precompressing and holding of the plastic material from rotating expels air from the plastic material with consequent reduction in voids in the extrudate and increases the feeding capacity of the screw so that the metering section will be filled and the material will be subjected to desired compression and working so that it will be fully plasticated and thermally homogeneous by the time that it reaches the extrusion die 4. In the example here shown, the bore 11 for a 4½" extruder has a taper of about 6¼" length and of angle such that the diameter at the feed opening 10 is about ½" greater than the diameter of the feed screw 5.

As known in the art, the feed throat 9 will be provided with suitable passages 13 for circulation of fluid for temperature control.

The wedged feed throat 9 of the invention herein disclosed have been found particularly effective with ground scrap both sheet and film as well as filaments and, of course, feeding of pellets and powder is improved due to the wedging and keying action. It has been found that air explusion is better with all types of materials whether scrap, or pellets, granules, or powder. Such initial air expulsion reduces voids in the extrudate.

Following are several comparative examples showing the markedly increased capacity of the tapered wedge throat extruder herein over conventional extruders not having said wedge throat.

EXAMPLE 1

When processing a scrap high impact styrene generated as from grinding defective cup lids through a ½" screen, a rate of 230 #/hr. was obtained on a 3½" 24:1 L/D extruder running at 186 r.p.m. By using the wedged feed throat herein, the rate was increased to 720 #/hr. without changing the screw 6 or 17 or without increasing screw speed. With the same material on a 4½" 24:1 L/D extruder, running at 120 r.p.m., rate increased from 600 to 1000 #/hr. In both cases, the sheet prdouced was more uniform and contained fewer voids.

EXAMPLE 2

On another 4½" 24:1 L/D vented machine for extruding sheet from virgin pellets with another grade of high impact styrene, the rate was increased from 1200 to 1600 #/hr. without increasing screw speed.

EXAMPLE 3

On a 3½" 24:1 L/D vented machine, nylon thread of 7 to 20 denier chopped to random lengths of 1–2" with occasional longer threads up to 12", could only be processed at 95 #/hr. Using the wedged feed throat, rates over 200 #/hr. were obtained.

EXAMPLE 4

On polyethylene film scrap of variable thickness (.002" to .007"), run through a ½" screen on a grinder, rates of 100 #/hr, were possible when fed directly, and 390 #/hr. when fed through the wedged feed throat.

EXAMPLE 5

All grades of foamed styrene scrap can be fed more readily through the wedged feed throat. A foam of 5 #/ft³ ground through a ⅜" screen would run at 40 #/hr. through a normal 3½", 24:1 extruder. In the same extruder, equipped with the wedged feed throat herein rates up to 420 #/hr. were obtained.

Other modes of applying the principle of the invention may be employed, change being made as regards the details described, provided the features stated in any of the following claims, or the equivalent of such, be employed.

I therefore particularly point out and distinctly claim as my invention:

1. An extruder comprising a barrel having a feed opening adjacent one end for introduction of solid particles of plastic and an extrusion die at the other end; a feed screw rotatable in said barrel to advance and work such plastic to plasticize the same for extrusion through said die; the wall of said barrel adjacent to said feed opening having a tapered bore into which solid particles of plastic are wedged as they are fed by said feed screw toward said die; said tapered bore having circumferentially spaced apart splines to resist turning of the plastic while it is compressed by the wall of said tapered bore; at least two of said splines extending into the axial region of said feed opening in circumferentially spaced relation thereto, the circumferentially upstream one of said two splines in said axial region being of less radial depth than the other one of said two splines for providing an increased radial clearance with said screw thus to equalize the supply of material to the wedge-shaped spaces between said splines.

2. An extruder comprising a barrel having a longitudinal bore therein and a feed opening adjacent one end for introduction of plastic into said bore; a feed screw rotatable in said bore to advance and work such plastic to plasticize the same; said bore axially adjacent said feed opening being tapered from a diameter greater than said feed screw to a diameter approximately equal to said feed screw for wedging of the plastic toward said feed screw as it is advanced thereby; and at least one axially extending spline means on the wall of said tapered bore for resisting turning of the plastic while it is compressed by the wall of said tapered bore.

3. The extruder of claim 2 wherein said one spline means extends into the axial region of said feed opening in circumferentially spaced relation thereto, said one spline means having a radial clearance with said feed screw to permit flow of plastic around said feed screw in the region of said feed opening.

4. The extruder of claim 2 wherein said one spline means extends into the axial region of said feed opening in substantially circumferentially spaced relation thereto in the direction of material flow around said feed screw, said one spline means having substantially zero clearance with said feed screw to resist turning of the plastic in such region of said feed opening.

5. The extruder of claim 2 wherein there are at least two circumferentially spaced apart spline means on the wall of said tapered bore to resist turning of the plastic while it is compressed by the wall of said tapered bore; said two spline means extending into the axial region of said feed opening in circumferentially spaced relation thereto, the circumferentially upstream one of said two spline means in said axial region being of less radial depth than the other one of said two spline means for providing an increased radial clearance with said screw thus to equalize the supply of material to the wedge-shaped spaces between said splines.

References Cited

UNITED STATES PATENTS

| | | | |
|---|---|---|---|
| 2,807,832 | 10/1957 | Davis | 18—125 |
| 3,019,484 | 2/1962 | Strohmer | 18—125 |
| 3,101,511 | 8/1963 | Heston | 18—125 |
| 3,327,347 | 6/1967 | Schippers | 18—125 |
| 3,327,348 | 6/1967 | Roehlig | 18—125 |

WILLIAM J. STEPHENSON, *Primary Examiner.*